US011702490B2

(12) United States Patent
Lee et al.

(10) Patent No.: US 11,702,490 B2
(45) Date of Patent: Jul. 18, 2023

(54) POLYMER, ION-EXCHANGE MEMBRANE, AND STRUCTURE-ENHANCED MEMBRANE EMPLOYING THE SAME

(71) Applicant: INDUSTRIAL TECHNOLOGY RESEARCH INSTITUTE, Hsinchu (TW)

(72) Inventors: Hsuan-Wei Lee, Zhudong Township (TW); Cheng-Hsiu Tsai, Hsinchu (TW); Chiu-Tung Wang, Tianwei Township (TW); Li-Duan Tsai, Hsinchu (TW); Tzu-Ying Chen, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 601 days.

(21) Appl. No.: 16/690,642

(22) Filed: Nov. 21, 2019

(65) Prior Publication Data
US 2021/0024672 A1 Jan. 28, 2021

(30) Foreign Application Priority Data
Jul. 22, 2019 (TW) .................................. 108125799

(51) Int. Cl.
*C08F 212/08* (2006.01)
*C08L 73/02* (2006.01)
*C08L 79/08* (2006.01)
*C08K 5/00* (2006.01)
*B01D 15/36* (2006.01)
*B01J 39/19* (2017.01)

(52) U.S. Cl.
CPC .......... *C08F 212/08* (2013.01); *C08K 5/0025* (2013.01); *C08L 73/02* (2013.01); *C08L 79/08* (2013.01); *B01D 15/361* (2013.01); *B01J 39/19* (2017.01); *C08L 2312/00* (2013.01)

(58) Field of Classification Search
CPC ................. C08F 222/08; C08F 222/40; C08G 85/002–004; C08J 3/24–26; B01J 39/00–26; C08L 79/08; C08L 25/08; C08L 35/06; H01M 8/102; H01M 8/1027; H01M 8/103; H01M 2300/0082
See application file for complete search history.

(56) References Cited

U.S. PATENT DOCUMENTS

| 4,478,727 | A | 10/1984 | Turner et al. |
| 4,919,821 | A | 4/1990 | Fong et al. |
| 7,663,064 | B2 | 2/2010 | Dutta et al. |
| 7,919,437 | B2 | 4/2011 | Duncum et al. |
| 8,623,964 | B2 | 1/2014 | Song et al. |
| 8,652,579 | B2 | 2/2014 | Shooshtari et al. |
| 2009/0148777 | A1* | 6/2009 | Song ..................... H01M 8/103 526/272 |
| 2016/0315347 | A1* | 10/2016 | Li ......................... H01M 4/624 |
| 2018/0237653 | A1* | 8/2018 | Cloete ..................... C09D 7/65 |

FOREIGN PATENT DOCUMENTS

| CN | 103910898 A | 7/2014 |
| CN | 101883809 B | 8/2015 |
| TW | 201136953 A * | 11/2011 |
| TW | I439473 B | 6/2014 |
| TW | I636068 B | 9/2018 |

OTHER PUBLICATIONS

Kuo et al. Preparation, characterization, and properties of new crosslinked proton-conducting membranes with polyoxyalkylene moieties. Polymer, 2008, 49, 1792-1799. (Year: 2008).*
Machine Translation of TW201136953A. Nov. 1, 2011. (Year: 2011).*
The Jeffamine Polyetheramines. Huntsman Corporation. 2007. (Year: 2007).*
Hsu et al. Highly conductive, crosslinked ionomers based on poly(styrene-co-maleic anhydride) for water electrolysis. J. Mater. Chem. A, 2013, 1, 8093. (Year: 2013).*
Arunbabu et al., "Emulsion copolymerization of styrene and sodium styrene sulfonate: kinetics, monomer reactivity ratios and copolymer properties", Polymer International, vol. 58, pp. 88-96, Nov. 18, 2008.
Moghadam et al., "Preparation of SMA functionalized sulfanilic acid hydrogels and investigation of their metal ions adsorption behavior", Iranian Polymer Journal, vol. 22, pp. 133-142, 2013.
Sachan et al., "Proton transport properties of sulphanilic acid tethered poly(methyl vinyl ether-alt-maleic anhydride)-PVA blend membranes", European Polymer Journal, vol. 56, pp. 45-58, 2014.
Zakir et al., "Preconcentration and Determination of Vanadium (V) in Environmental Samples by Using Chemically Modified Styrene Maleic Anhydride", International Journal of Research Studies in Science, Engineering and Technology, vol. 3, Issue 10, pp. 17-22, Oct. 2016.
Taiwanese Office Action and Search Report for Taiwanese Application No. 108125799, dated Feb. 25, 2020.

* cited by examiner

*Primary Examiner* — Stephen E Rieth
(74) *Attorney, Agent, or Firm* — Birch, Stewart, Kolasch & Birch, LLP

(57) ABSTRACT

The present disclosure provides a polymer, including a first repeating unit represented by formula (I), a second repeating unit represented by formula (II), and a third repeating unit represented by formula (III). The first repeating unit, the second repeating unit, and the third repeating unit are arranged in an alternating fashion, in a random fashion, or in discrete blocks. The molar ratio of the first repeating unit, the second repeating unit and the third repeating unit is m:n:o, and m:(n+o) is from 60:40 to 85:15. The definitions of a, $R^1$, $R^2$, $A^-$, and $R^+$ are as defined in the specification.

4 Claims, 4 Drawing Sheets

POLYMER, ION-EXCHANGE MEMBRANE, AND STRUCTURE-ENHANCED MEMBRANE EMPLOYING THE SAME

CROSS REFERENCE TO RELATED APPLICATIONS

The present application is based on, and claims priority from, Taiwan Application Serial Number 108125799, filed on Jul. 22, 2019, the disclosure of which is hereby incorporated by reference herein in its entirety.

TECHNICAL FIELD

The present disclosure relates to a polymer, and particularly to a polymer used in membranes, ion-exchange membranes, and structure-enhanced membranes employing the polymer.

BACKGROUND

With the increasing popular awareness of environmental protection issues and the growing demand for water resources, water treatment-related research such as raw water desalination and wastewater recycling are booming. A common raw water desalination method is electrodialysis (ED). Cations can only penetrate through a cation-exchange membrane and anions can only penetrate through an anion-exchange membrane. Electrodialysis (ED) utilizes this property to separate selected cations and anions from each other in water through an ion-exchange membrane. Specifically, by applying a DC electric field, anions (e.g., $Cl^-$) in raw water will move toward the anode, and cations (e.g., $Na^+$) will move toward the cathode, so that desalinated fresh water and concentrated salt water can eventually be obtained, and the purpose of desalination of raw water is achieved.

Therefore, ion-exchange membranes are a key component in the electrodialysis process, and the performance of ion-exchange membranes can directly influence the overall quality of an electrodialysis system. Although existing ion-exchange membranes generally meet requirements, they are not satisfactory in all respects, so there is still a demand for improved materials in ion-exchange membranes.

SUMMARY

Some embodiments of the present disclosure provide a polymer, which includes a first repeating unit represented by formula (I), a second repeating unit represented by formula (II), and a third repeating unit represented by formula (III):

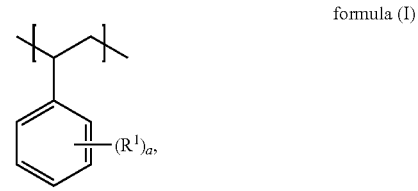

formula (I)

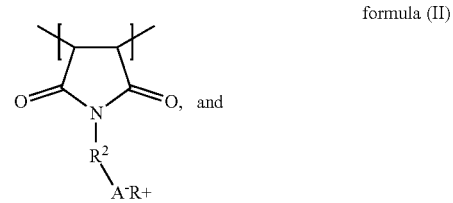

formula (II)

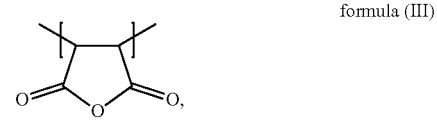

formula (III)

wherein the first repeating unit, the second repeating unit, and the third repeating unit are arranged in an alternating fashion, in a random fashion, or in discrete blocks, the molar ratio of the first repeating unit, the second repeating unit, and the third repeating unit is m:n:o, and m:(n+o) is from 60:40 to 85:15.

a is an integer from 0 to 5; $R^1$ is a $C_1$-$C_8$ alkyl group, a $C_3$-$C_8$ cycloalkyl group, a $C_1$-$C_8$ alkoxyl group, or a $C_1$-$C_8$ alkoxyalkyl group; $R^2$ is a $C_6$-$C_{16}$ arylene group, a $C_1$-$C_8$ alkylene group, a $C_3$-$C_8$ cycloalkylene group, or a $C_1$-$C_8$ alkoxyalkylene group; $A^-$ is $-SO_3^-$, $-NO_3^-$, or $-COO^-$; and $R^+$ is $H^+$, $Li^+$, $Na^+$, $K^+$, or $NH_4^+$.

Some embodiments of the present disclosure provide a crosslinked polymer having a structure represented by formula (VI) or a structure represented by formula (VII):

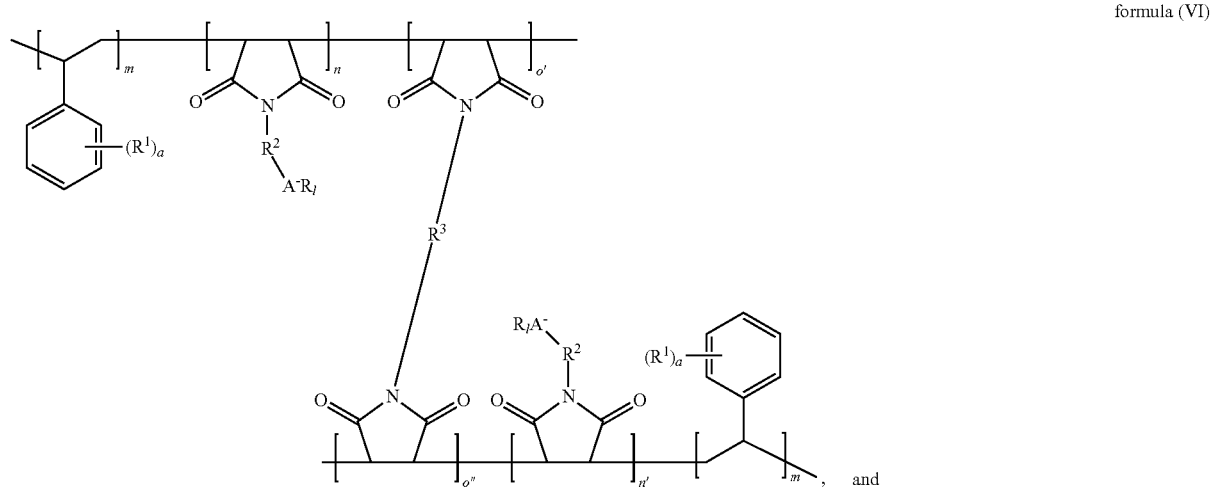

formula (VI)

, and

-continued formula (VII)

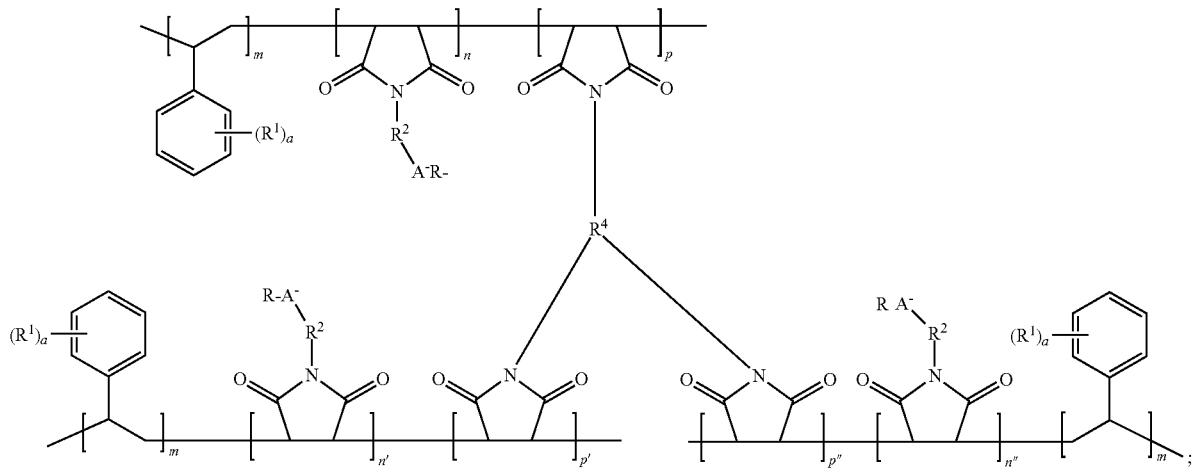

wherein units in formula (VI) and units in formula (VII) are arranged in an alternating fashion, in a random fashion, or in discrete blocks; a, $R^1$, $R^2$, $A^-$, and $R^+$ have the same definition as in paragraph [0007]; m:n is from 99:1 to 70:30; n:o' is from 2:1 to 3:7; n:p is from 6:4 to 4:6; m:n' is from 99:1 to 70:30; n':o" is from 2:1 to 3:7; n':p' is from 6:4 to 4:6; m:n" is from 99:1 to 70:30; n":p" is from 6:4 to 4:6;

n' and n" have the same definition as n; and p' and p" have the same definition as p.

$R^3$ is

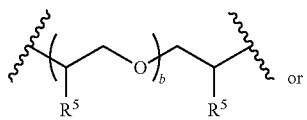 or

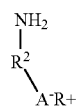;

$R^4$ is

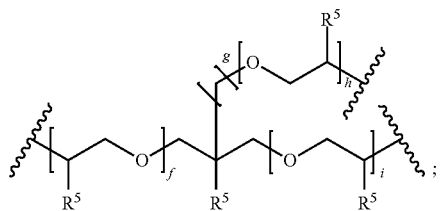;

and $R^5$ is H or a $C_1$-$C_4$ alkyl group. b is 1 to 40; c+e is 1 to 6, d is 1 to 40; f+h+i is 5 to 10 and g is 0 or 1.

Some embodiments of the present disclosure provide a crosslinked polymer formed from a compound having a styrene-maleic anhydride structure, a compound having a

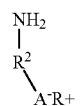

structure, and a compound having multiple amino terminal groups, wherein $R^2$, $A^-$, and $R^+$ have the same definition as in paragraph [0007];

an equivalent quantity ($N_1$) of the compound having a

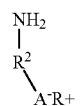

structure is less than an equivalent quantity ($N_2$) of the compound having a styrene-maleic anhydride structure, that is, N1<N2; and an equivalent quantity ($N_3$) of the compound having multiple amino terminal groups is greater than or equal to ($N_2$—$N_1$)/number of amino groups in the compound having multiple amino terminal groups.

A detailed description is given in the following embodiments with reference to the accompanying drawings.

DETAILED DESCRIPTION

Figure 1:
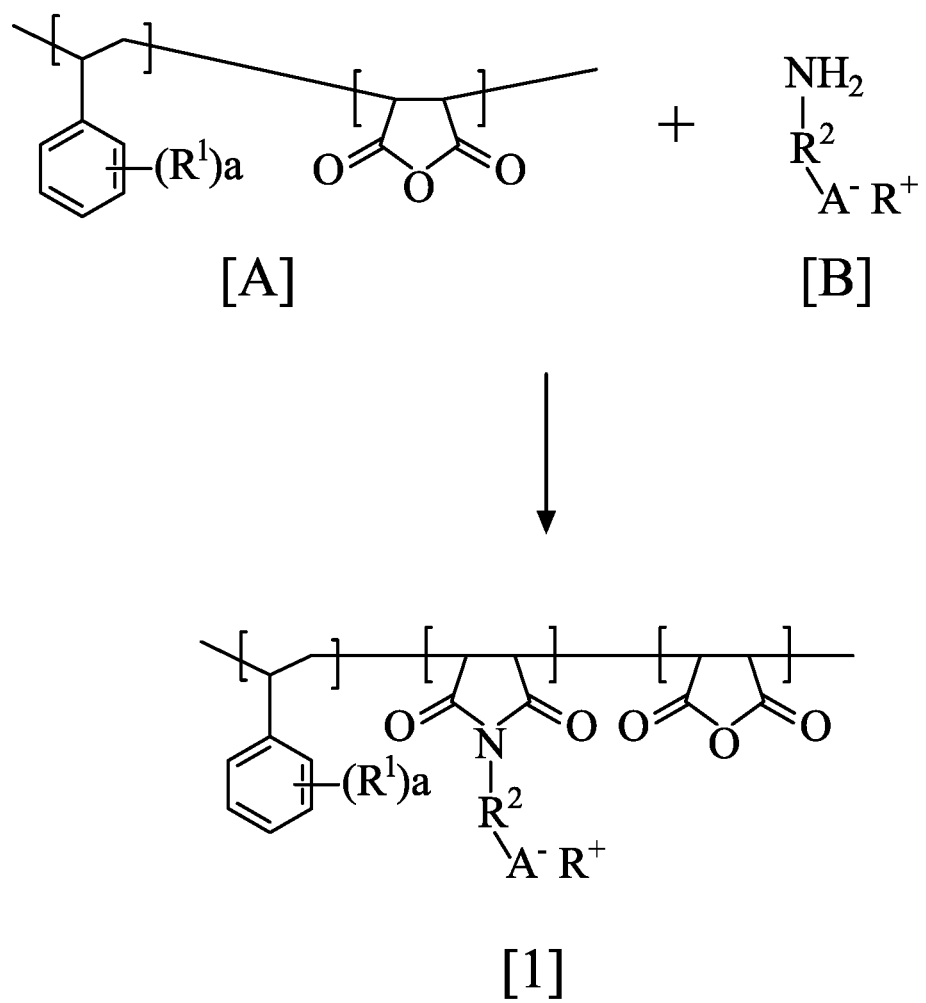
FIG. 1 is a schematic drawing of the synthesis of a polymer [1] according to some embodiments of the present disclosure.

The following provides a detailed description of the polymer, the crosslinked polymer, and the membranes including the above provided in the present disclosure. It should be understood that the many different embodiments or examples that follow are for implementing different features of the subject matter provided. Specific examples of components and arrangements are described below to simplify the present disclosure. These are, of course, merely examples and are not intended to be limiting. In addition, the present disclosure may repeat reference numerals and/or letters in the various embodiments or examples for the present disclosure to be described clearly. These repetitions are for the purpose of simplicity and clarity and do not in themselves dictate a relationship between the various embodiments and/or configurations discussed.

It should be understood that the components or devices in the figures may be present in various forms known to ones skilled in the art. Besides, relative terms, such as "below", "lower" or "bottom" or "above", "higher" or "top", may be used to describe one element's relationship to another element(s) as illustrated in the figures. It should be understood that when a device in the figures is flipped over, then an element as illustrated on a "lower" side will become on a "higher" side. The embodiments of the present disclosure can be comprehended accompanying the figures, and the figures of the present disclosure are regarded as a part of the disclosure. It should be noted that various features are not drawn to scale. In fact, the dimensions of the various features may be arbitrarily increased or reduced for clarity of discussion.

The terms "about," "approximate," and "substantially" are intended to encompass numbers that are within 5% of a given number or range, preferably within 3%, more preferably within 2%, or within 1%, or within 0.5%. This given quantity is an approximate quantity. That is, even without indicating "about," "approximate," or "substantially", such quantity still inherently encompasses the meaning of "about," "approximate," and/or "substantially".

In the present specification, the range indicated by "a value to another value" is a schematic representation that avoids listing all the values within the range in the specification. Therefore, unless specifically stated otherwise, when a specific range of values is recited in the present invention, it is equivalent to the disclosure of any value in the range and any smaller range defined by any values within the range (including an integer and one decimal place). This arbitrary value and this smaller range are defined as if the arbitrary value and this smaller range are explicitly written in the specification. For example, when only "1 to 10" is described, it is equivalent to disclosing the range of "3 to 5" and "2.5-6.8", regardless of whether other values are listed in the specification.

The following provides description of the embodiments of the present disclosure. The specific compositions of the embodiments are for exemplary only and are not for limiting the scope of protection. Those skilled in the art may make various modifications and changes according to actual needs without departing from the spirit and scope of the present disclosure.

Figure 2:
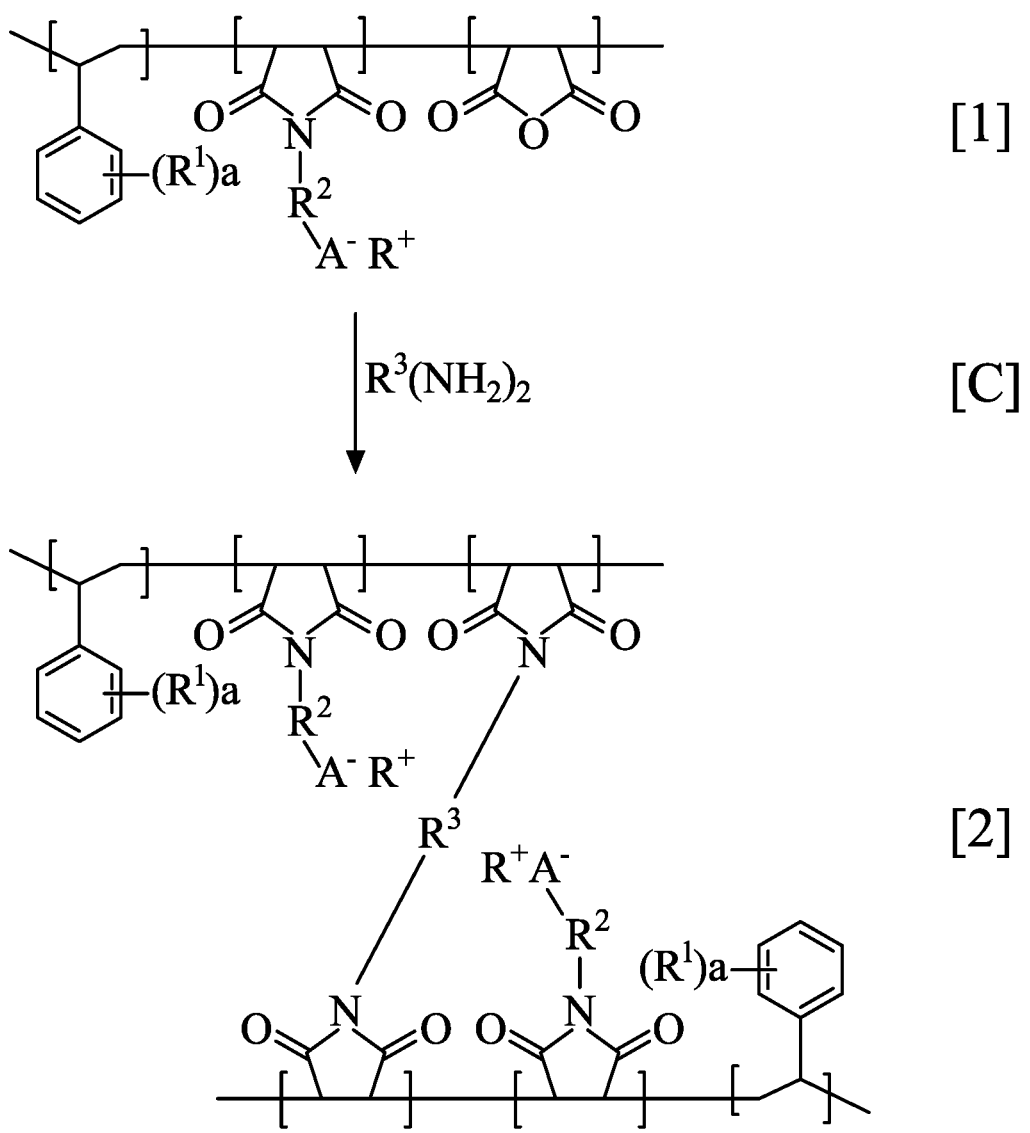
FIG. 2 is a schematic drawing of the synthesis of a crosslinked polymer [2] according to some embodiments of the present disclosure.

In order for the present disclosure to be understood more clearly, the synthetic routes of the present disclosure are described accompanying the reaction equations in FIG. 1 and FIG. 2. Please refer to FIG. 1, according to some embodiments, a polymer [1] is provided, which may be formed by the reaction of a starting polymer [A] having a styrene-maleic anhydride structure with a specific dose of a grafting reagent [B], which results in that some of the maleic anhydride units in the starting polymer [A] are grafted with negatively charged anionic groups. By introducing anionic groups A⁻ into the polymer [1], the membranes made of the polymer [1] can be provided with lower sheet resistance.

Please refer to FIG. 2, according to some other embodiments, a crosslinked polymer [2] is provided. As described above, since only some of the maleic anhydride units in the starting polymer [A] are grafted with negatively charged anionic groups, the as-formed polymer [1] still has ungrafted maleic anhydride units. With these ungrafted maleic anhydride units, the polymer [1] may further react with a crosslinking reagent [C], so that bonding can be formed between the ungrafted maleic anhydride units, such that the molecular chains of the polymer [l] crosslink and form the crosslinked polymer [2].

The following further provides detailed description of each of the specific compositions of the present disclosure.

Polymer [1]

According to some embodiments of the present disclosure, the polymer [1] includes a first repeating unit represented by formula (I), a second repeating unit represented by formula (II), and a third repeating unit represented by formula (III).

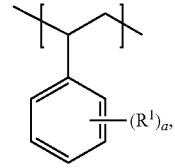

formula (I)

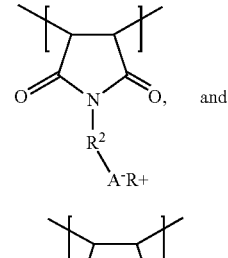

formula (II)

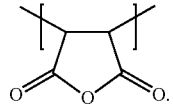

formula (III)

The arrangement of the first repeating units, the second repeating units, and the third repeating units are not limited to any specific type of arrangement. That is, these repeating units may be arranged in an alternating fashion, in a random fashion, or in discrete blocks. As described above, the polymer [1] includes the second repeating unit having grafted anionic groups as represented by formula (II) and the third repeating unit ungrafted with anionic groups as represented by formula (III).

In formula (I), $R^1$ may be a $C_1$-$C_8$ alkyl group, a $C_3$-$C_8$ cycloalkyl group, a $C_1$-$C_8$ alkoxyl group, or a $C_1$-$C_8$ alkoxyalkyl group. The alkyl group, the alkoxyl group, and the alkoxyalkyl group described herein may be linear or branched or have substituents such as a hydroxyl group, a haloalkyl group, and the like which do not excessively affect the subsequent graft reaction, crosslinking reaction, and etc. The cycloalkyl group described herein may also have substituents such as a hydroxyl group, a haloalkyl group, and the like which do not excessively affect the subsequent graft reaction, crosslinking reaction, and etc.

For example, the $C_1$-$C_8$ alkyl group, the $C_3$-$C_8$ cycloalkyl group, the $C_1$-$C_8$ alkoxyl group, or the $C_1$-$C_8$ alkoxyalkyl group may be methyl, ethyl, propyl, isopropyl, n-butyl, sec-butyl, isobutyl, tert-butyl, pentyl, cyclopentyl,

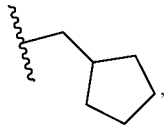 [SMILES: *CC1CCCC1 ; ","]

methoxyl, ethoxyl, —$CH_2OCH_2CH_3$, —$CH_2CH_2CH_2OCH_3$, and etc. a in formula (I) may be an integer from 0 to 5.

In formula (II), $R^2$ may be a $C_6$-$C_{16}$ arylene group (e.g.,

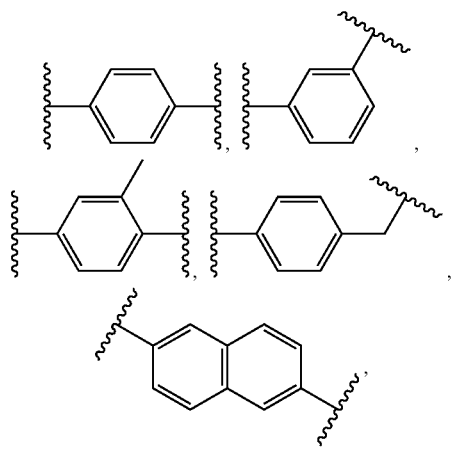

and etc.), a $C_1$-$C_8$ alkylene group, a $C_3$-$C_8$ cycloalkylene group (e.g., —$CH_2$—, —$CH_2CH_2$—, —$CH_2CH_2CH_2$—, —$CH(CH_3)CH_2$—,

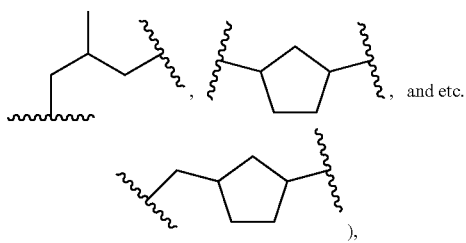

or a $C_1$-$C_8$ alkoxyalkylene group (e.g., —$CH_2OCH_2$—, —$CH_2OCH_2CH_2$—, —$CH_2OCH_2CH_2OCH_2$—, and etc.)

In formula (II), A may be an anionic group with one negative charge, for example, —$SO_3^-$, —$NO_3^-$, or —$COO^-$; $R^+$ may be a cation or a cationic group, for example, $H^+$, $Li^+$, $Na^+$, $K^+$, or $NH_4^+$. In some embodiments, compared to other anionic groups, when A is —$SO_3^-$, the membranes made of the polymer [1] can be provided with low sheet resistance.

In some embodiments, the weight average molecular weight (Mw) of the polymer [1] can be measured by gel permeation chromatography (GPC), and the weight average molecular weight (Mw) of the polymer [1] may be from 5000 to 400000. When the weight average molecular weight (Mw) of the polymer [1] is from 50000 to 100000, the polymer [1] can have a more appropriate viscosity and thus a better film-forming ability, which makes it easier to perform the manufacturing process for forming ion-exchange membranes.

In some embodiments, the polymer [1] may be formed by the reaction of the staring polymer [A] having a styrene-maleic anhydride structure with the grafting reagent [B]. Considering the reactivity of the starting polymer [A] in the synthesis and requiring adequate maleic anhydride units for subsequent reactions, in some embodiments, the molar ratio of the styrene unit to the maleic anhydride unit in the starting polymer [A] is from 60:40 to 85:15, for example, from 60:40 to 75:25. Since the polymer [1] is formed of the starting polymer [A], the second repeating unit

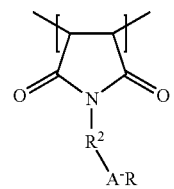

and the third repeating unit

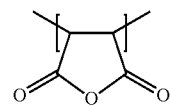

are both from the maleic anhydride units of the starting polymer [A]. Therefore, the molar ratio of the first repeating unit, the second repeating unit, and the third repeating unit in the polymer [a] is represented by m:n:o, and m:(n+o) is from 60:40 to 85:15, for example, from 60:40 to 75:25.

In some embodiments, the molar ratio of the first repeating unit to the second repeating unit is represented by m:n, and m:n may be from 99:1 to 70:30, for example, from 85:15 to 70:30. The molar ratio of the second repeating unit to the third repeating unit is represented by n:o, and n:o may be from 90:10 to 30:70, for example, from 60:40 to 30:70.

In some embodiments, the starting polymer [A] may include a structure represented by formula (IV):

formula (IV)

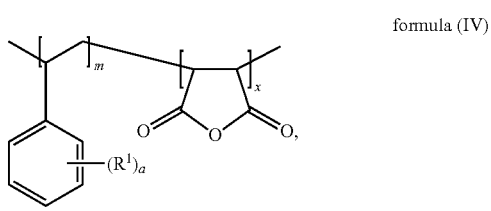

In formula (IV), the arrangement of the units is not limited to any specific type of arrangement. The molar ratio of the styrene unit to the maleic anhydride unit is represented by m:x, and m:x may be from 60:40 to 85:15, for example, from 60:40 to 75:25, as described above. The definitions of $R^1$ and a are the same as those of $R^1$ and a for polymer [1]. In some embodiments, the starting polymer [A] may only have the structure represented by formula (IV).

In some embodiments, when the molar ratio of the styrene unit (e.g.,

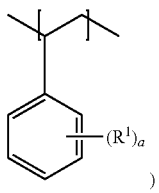

)

to the maleic anhydride unit (e.g.,

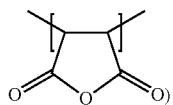

is m:x, the polymer [a] formed therefrom may have a structure represented by formula (V):

formula (V)

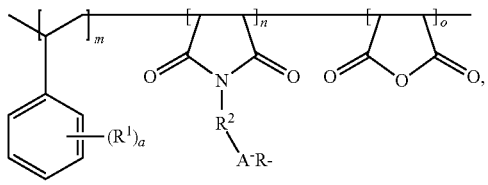

In formula (V), the arrangement of the units is not limited to any specific type of arrangement. The units may be arranged in an alternating fashion, in a random fashion, or in discrete blocks. The definitions of $R^1$, a, $R^2$, $A^-$, and $R^+$ are the same as those of $R^1$, a, $R^2$, $A^-$, and $R^+$ for polymer [1]. The unit

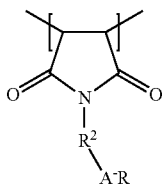

and the unit

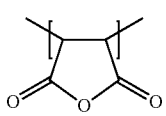

are both from the maleic anhydride units of the starting polymer [A] (the maleic anhydride units in the starting material react with the grafting reagent to form the units

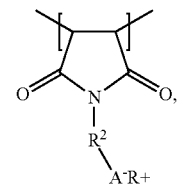

and the maleic anhydride units that do not react with the grafting reagent remain). Therefore, in formula (V), the molar ratios of m, n and o satisfy: 0<n<x and x−n=o.

It should be noted that the polymer [1] is formed by using the starting polymer [A] as the starting material in the embodiments as described above, that is, the styrene unit and the maleic anhydride unit are in the same polymer. In some other embodiments of the present disclosure, the styrene unit and the maleic anhydride unit may be in different polymers, and the aforementioned polymer [1] may be obtained by reacting the starting material having styrene units and the starting material having the maleic anhydride units with a grafting reagent. In some embodiments, the polymer [1] may be formed from only the first repeating unit, the second repeating unit, and the third repeating unit.

Grafting Reagent [B]

In order to introduce anionic groups into the starting polymer [A], a compound having amino terminal groups and anionic groups is used as the grafting reagent [B]. In some embodiments, the grafting reagent [B] may have a

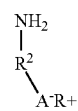

structure, wherein the definitions of $R^2$, $A^-$, and $R^+$ are the same as those of $R^2$, $A^-$, and $R^+$ for polymer [1]. The maleic anhydride units in the starting polymer [A] may react with the amino terminal groups in the grafting reagent [B] and undergo an acylation reaction, so that the anionic groups A are introduced into the starting polymer [A].

The equivalent quantity of the grafting reagent added has to be less than the equivalent quantity of the maleic anhydride units in the starting material, so that there are ungrafted maleic anhydride units remaining in the polymer [1]. That is, the molar ratio of the maleic anhydride units in the starting material to the grafting reagent has to be greater than 1, so that the polymer [1] has maleic anhydride units that are not reacted with the grafting reagent [B].

Anionic groups $A^-$ are introduced into the polymer [1], thus the membrane made of the polymer [1] can be provided with a lower sheet resistance. When an ion-exchange membrane made employing this material is used in an electrodialysis system, ionic dialysance can be performed by applying a relatively low operating voltage, and thus energy loss and operating costs can be reduced. Besides, since ungrafted maleic anhydride units still remain in the polymer [1], these units can further react with the crosslinking reagent [C] to obtain the crosslinked polymer [2], so that the viscosity of the polymer can be adjusted, and the mechanical strength of the polymer membrane formed of this polymer can be increased.

Crosslinking Reagent [C]

The polymer [1] may react with the crosslinking reagent [C] to obtain the crosslinked polymer [2]. In order to crosslink the polymers [1], in some embodiments, the crosslinking reagent [C] may be a compound having multiple amino terminal groups, for example, diamine crosslinking reagents or triamine crosslinking reagents. In some embodiments, the diamine crosslinking reagent may have a formula of $R^3(NH_2)_2$, and the triamine crosslinking reagent may have a formula of $R^4(NH_2)_3$. $R^3$ may be a $C_1$-$C_8$ linear group, a branch alkylene group,

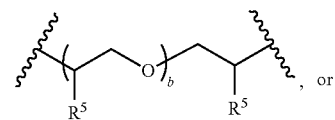, or

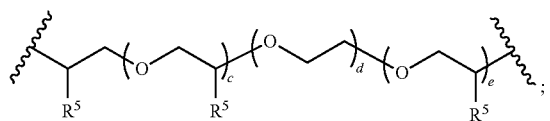;

$R^5$ may be independently H or a $C_1$-$C_4$ alkyl group; b may be from 1 to 40; c+e may be from 1 to 6, and d may be from 1 to 40. $R^4$ may be

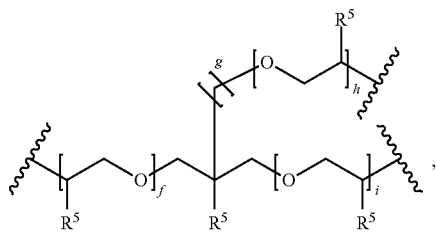, wherein. $R^5$ may be independently H or a $C_1$-$C_4$ alkyl group; f+h+i may be from 5 to 10; g may be 0 or 1. In some embodiments, the b in $R^3$ may be 6.1 or 33, c+e may be 3.6, and d may be 9. In $R^4$, f+h+i may be from 5 to 6, and g may be 1.

In some embodiments, by using a crosslinking reagent that has a long chain with polyether diamine or polyether triamine having ether bonds, the molecules of the as-formed crosslinked polymer [2] can have a better flexibility, so that the membrane subsequently formed of the crosslinked polymer [2] is not too fragile and thus has a better toughness. In some other embodiments, by using the crosslinking reagent [C] that has a relatively short chain and lower molecular weight (e.g., when the molecular weight of the crosslinking reagent [C] is less than 700), the crosslinked polymer formed therefrom subsequently can have a better acid and alkali resistance, so that the ion-exchange membrane formed therefrom can have a better durability when used in electrodialysis.

The polyether diamine is such as Jeffamine® D-230, Jeffamine® D-400, Jeffamine® D-2000, Jeffamine® D-4000, Jeffamine® ED-600, Jeffamine® ED-900, and the like, which are products manufactured by Huntsman company, and the polyether triamine is such as Jeffamine T-400. The number in each of the product name indicates the average molecular weight.

The crosslinking reagent [C] has multiple amino terminal groups, each of which can react with an ungrafted maleic anhydride unit in a different chain of the polymer [1], so that the polymers [I] are crosslinked to form the crosslinked polymer [2].

Crosslinked Polymer [2]

Please refer to FIG. 2, in some embodiments, the polymer [1] may react with a diamine crosslinking reagent $R^3(NH_2)_2$ or a triamine crosslinking reagent $R^4(NH_2)_3$ to obtain the crosslinked polymer [2] having a structure represented by formula (VI) or formula (VII):

formula (VI)

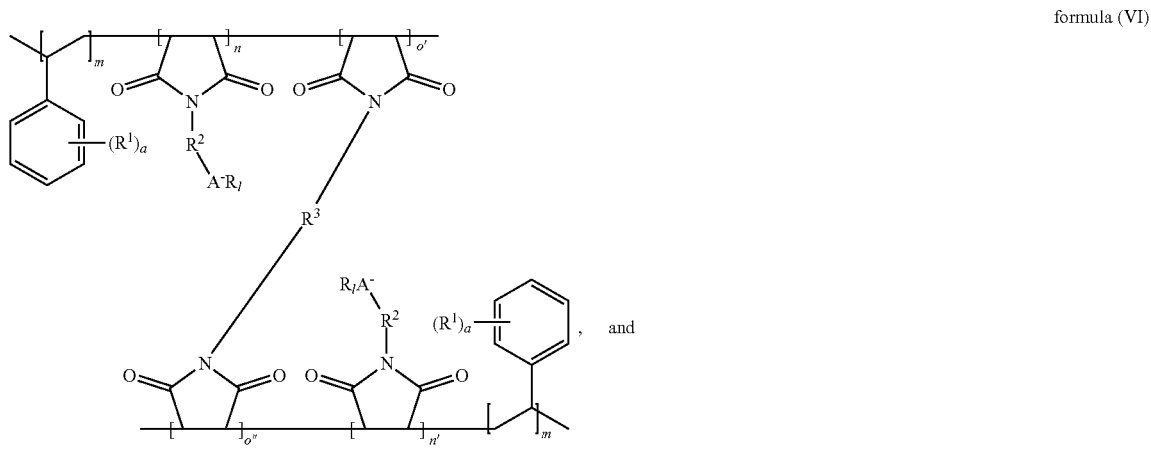, and

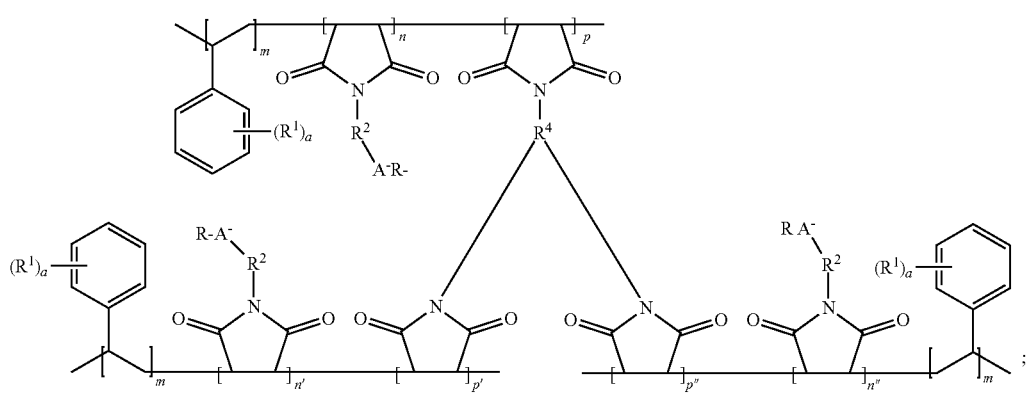

formula (VII)

wherein the definitions of a, $R^1$, $R^2$, $A^-$, and $R^+$ are the same as those of a, $R^1$, $R^2$, $A^-$, and $R^+$ for polymer [I], and the definitions of $R^3$ is formula (VI) and $R^4$ in formula (VII) are the same as those of $R^3$ and $R^4$ for the crosslinking reagent [C]. As described above, when the molar ratio of the styrene unit to the maleic anhydride unit in the starting material for forming the polymer [1] is represented by m:x, the molar ratios of m, n and o of the units in the polymer [1] represented by formula (V) satisfy: $0<n<x$ and $x-n=o$. The amino terminal groups in the crosslinking reagent [C] react with the remaining maleic anhydride units in the polymer [1], so that crosslinks formed between various polymers, every two maleic anhydride units can form a crosslinking unit in the structure represented by formula (VI), and every three maleic anhydride units can form a crosslinking unit in the structure represented by formula (VII). Therefore, in the structures represented by formula (VI) or formula (VII) formed from the structure represented by formula (V) reacting with the crosslinking reagent [C], the molar ratios of m, n and o' and the molar ratios of m, n and p of the units may satisfy: $0<n<x$, $0<o'\leq(x-n)/2$ and $0<p\leq(x-n)/3$. That is, the structures represented by formula (VI) or formula (VII) may still have some ungrafted and uncrosslinked maleic anhydride units.

In some embodiments, the molar ratios of units in different polymer chains in the crosslinked polymer [2] are not necessarily the same. That is, in formula (VI), n may not equal to n', and o' may not equal to o"; in formula (VII), n may not equal to n' and/or n", and p may not equal to p' and/or p". However, the definitions of the molar ratios of n' and o", n' and p', and n" and p" may be the same as those of n and o' and n and p. That is, the relationships of $0<n'<x$, $0<o"\leq(x-n)/2$, $0<p'\leq(x-n)/3$, $0<n"<x$, and $0<p"\leq(x-n)/3$ are satisfied.

In some embodiments, in formula (VI), the molar ratio of m:n may be from 99:1 to 70:30, and the molar ratio of n:o' may be from 2:1 to 3:7. In formula (VII), the molar ratio of n:p may be from 6:4 to 4:6.

In some embodiments, the crosslinked polymer [2] having a structure represented by formula (VI) or a structure represented by formula (VII) is formed from a compound having a styrene-maleic anhydride structure, a compound having a

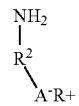

structure, and a compound having multiple amino terminal groups (e.g., a diamine crosslinking reagent or a triamine crosslinking reagent), and the definitions of $R^2$, $A^-$, and $R^+$ are the same as those of $R^2$, $A^-$, and $R^+$ for polymer [1]. An equivalent ratio of the compound having a styrene-maleic anhydride structure to the compound having a

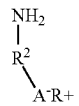

structure may be from 1:0.16 to 1:0.24. In addition, an equivalent ratio of the compound having

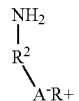

structure to the compound having multiple amino terminal groups may be from 3:7 to 2:1.

In some embodiments, the crosslinked polymer [2] having a structure represented by formula (VI) or a structure represented by formula (VII) may have a weight average molecular weight from 100000 to 1000000, for example, from 200000 to 500000.

Since the crosslinked polymer [2] has the crosslinked structure formed due to the crosslinking reagent [C], the membrane formed of the crosslinked polymer has an improved mechanical strength. Besides, the formation of the crosslinked structure can modify the original viscosity, so that it is easier for the crosslinked polymer to form a membrane, the operability of the manufacturing process is increased, and the membrane formed of the crosslinked polymer [2] has an improved flexibility and durability. Furthermore, the crosslinked polymer [2] further has anionic groups in addition to the crosslinked structure, thus the crosslinked polymer [2] also has in improved conductivity other than the aforementioned advantages.

According to some embodiments of the present disclosure, the polymer [1] and the crosslinked polymer [2] both can be used for preparing ion-exchange membranes. The preparation method may include dissolving the aforementioned polymer or crosslinked polymer in a suitable solvent (e.g., dimethylacetamide (DMAc), dimethyl sulfoxide (DMSO), N-methyl-2-pyrrolidone (NMP), tetrahydrofuran, or methyl ethyl ketone) or dispersing the aforementioned polymer or crosslinked polymer in a suitable dispersion medium until a suitable concentration of ratio is achieved (e.g., the polymer solution including 20 wt % to 50 wt % of the polymer), and coating the polymer solution on a substrate (e.g., a glass substrate) by a tool, such as a scraper, to form a coating. After baking the coating at a high temperature, which is lower than the decomposition temperature of the polymer, to remove most of the solvent, the ion-exchange membrane as described herein is obtained. The thickness of the ion-exchange membrane may be from 15 µm to 300 µm.

In some embodiments, a large amount of the crosslinking reagent (e.g., the aforementioned diamine crosslinking reagent $R^3(NH_2)_2$ or triamine reagent $R^4(NH_2)_3$) is added in the reaction, so that the as-formed polymer membrane has unreacted crosslinking reagent, which can increase the overall flexibility of the membrane.

According to the embodiments of the present disclosure, the polymer [1] of the crosslinked polymer [2] described in the present disclosure can be further used in manufacturing structure-enhanced membrane to form a membrane having a composite structure. According to some embodiments of the present disclosure, the structure-enhanced membrane may include the aforementioned polymer [1] or crosslinked polymer [2] and a substrate, and the substrate may be made of a porous material (e.g., a glass fiber cloth). The polymer [1] or the crosslinked polymer [2] is coated on at least a surface of the substrate to form the structure-enhanced membrane. When the substrate is made of a porous material, the polymer may further filled or permeate into the pores of the substrate.

Figure 3:
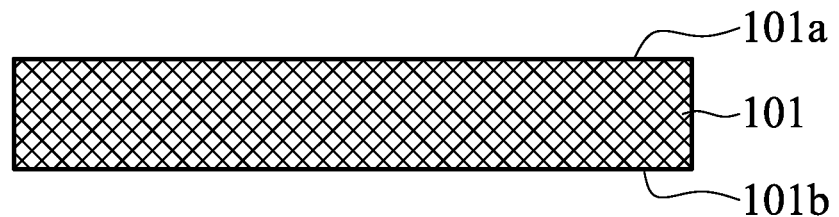
FIG. 3 is a schematic drawing of a substrate used in some embodiments of the present disclosure.
Figure 4:
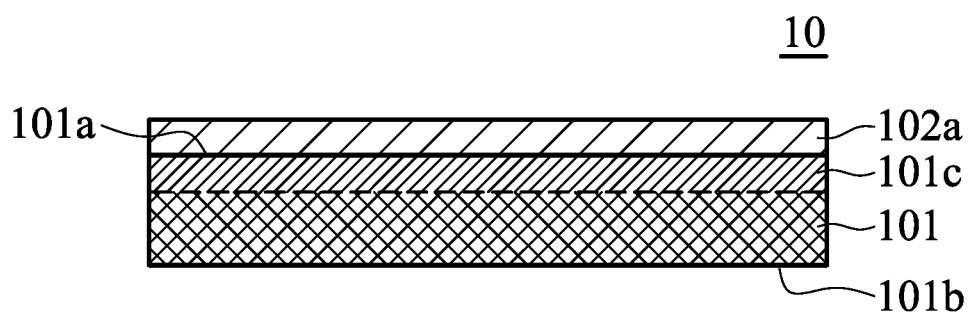
FIG. 4 to FIG. 7 are cross-sectional views of structure-enhanced membranes according to some embodiments of the present disclosure.
Figure 5:
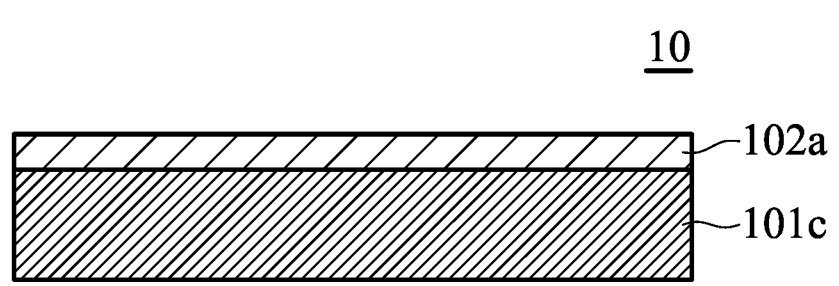

Specifically, the manufacturing method of the structure-enhanced membrane may include the following steps. First, as shown in FIG. 3, a substrate 101 is provided, the substrate 101 may be a porous substrate having pores, and the substrate has a first main surface 101a and a second main surface 101b opposite to the first main surface 101a. Next, please refer to FIG. 4, the polymer [1] or the crosslinked polymer [2] is coated in the first main surface 101a of the substrate 101 to form a first polymer membrane 102a, and thus the structure-enhanced membrane 10 as described in the present disclosure is obtained. When the substrate 101 is made of a porous material, part of the polymer [I] or the crosslinked polymer [2] may further permeate into the pores of the substrate 101, and the region of the substrate 101 that is permeated with the polymer [I] or the crosslinked polymer [2] form a hybrid membrane 101c. According to some other embodiments of the present disclosure, when the thickness of the substrate 101 is relatively thick, or the polymer [1] or the crosslinked polymer [2] used for coating has a relatively low viscosity, part of the polymer [1] or the crosslinked polymer [2] may permeate into the overall substrate 101, so that the whole substrate 101 turns into the hybrid membrane 101c, and the structure-enhanced membrane 10 formed from the first polymer membrane 102a and the hybrid membrane 101c is obtained, as shown in FIG. 5.

Figure 6:
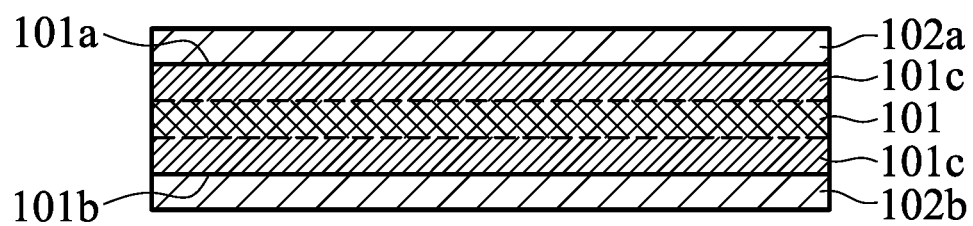
Figure 7:
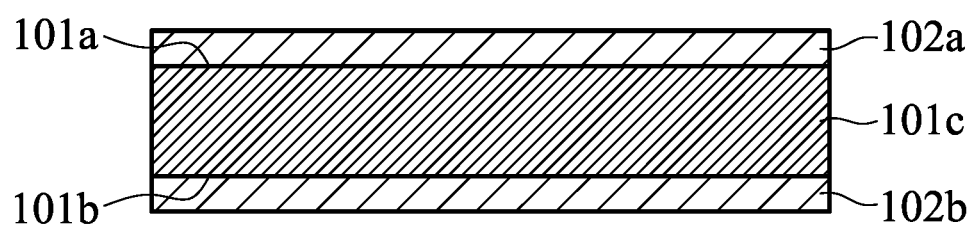

Please refer to FIG. 6, according to some other embodiments of the present disclosure, the polymer [1] or the crosslinked polymer [2] may be both coated on the first main surface 101a and the second main surface 101b to respectively for the first polymer membrane 102a and a second polymer membrane 102b, to form the structure-enhanced membrane 10. As described above, when the substrate 101 is made of a porous material, the first polymer membrane 102a and the second polymer membrane 102b may permeate into the substrate 101 to form the hybrid membranes 101c. In some embodiments, as shown in FIG. 7, the substrate 101 of the structure-enhanced membrane 10 may be a hybrid membrane 101c by itself. It should be noted that the materials of the first polymer membrane 102a on the first main surface 101a and the second polymer membrane 102b on the second main surface 101b may be the same or different from each other, and the first polymer membrane 102a and the second polymer membrane 102b may independently include one or more polymers. Therefore, the hybrid membrane 101c may include one or more polymers.

In some embodiments, the material of the substrate 101 may be glass fiber, polytetrafluoroethene (PTFE), polyimide (PI), polyethylene terephthalate (PET), polyether ether ketone (PEEK), polypropylene (PP), polyethylene (PE), polyvinylidene fluoride (PVDF), or a combination thereof. The aforementioned structure-enhanced membrane can be used as an ion conducting membrane or a separation membrane for water treatments, a composite ion-exchange membrane for applications in fuel cells, an ion conducting membrane for applications for lithium ion batteries, or an ion conducting membrane or a separation membrane for electrocatalytic hydrogen production.

By introducing a substrate together with the polymer or the crosslinked polymer to form the structure-enhanced membrane, a polymer membrane having a high mechanical strength can be obtained, which can be provided with a further improved durability and practicability in practical applications.

Further explanation is provided with the following embodiments of the preparation of the polymers of the present disclosure for showing the technical features of the present disclosure.

Unless otherwise stated in the present disclosure, the temperatures are all Celsius, and the room temperature is from 22° C. to 27° C.

[Preparation example]: the staring polymer [A] having styrene units and maleic anhydride units, styrene-maleic anhydride (SMA) polymer, was prepared.

100 equivalents of maleic anhydride, 150 equivalents of styrene, and 1 equivalent of azodiisobutyronitrile (AIBN) were placed in a two-neck flask, 100 mL of butanone was added to dissolve the reactants, and the reaction temperature was raised to 80° C. and let the reaction carry out for 2 hours. Solids were precipitated with methanol, and the residual monomers were washed and dried under reduced pressure, to obtain styrene-maleic anhydride (SMA) polymer. The yield was 95-99%, the molecular weight (Mw) was 81000 Da, and the polymer dispersity index (PDI) is 1.87. In the styrene-maleic anhydride (SMA) polymer, the molar ratio of the styrene unit to the maleic anhydride unit was 6:4.

[Embodiment 1]: The starting polymer [A] having styrene units and maleic anhydride units was reacted with the grafting reagent [B] to obtain the polymer [1] and then reacted with the crosslinking reagent [C] to obtain the crosslinked polymer [2].

0.1 equivalent of the styrene-maleic anhydride (SMA) polymer obtained from the preparation example and 0.16 equivalent of sulfanilic acid sodium salt hydrate were added into 20 mL of dimethylacetamide (DMAc) in a single-neck flask, and the reaction temperature was raised to 165° C. and let the reaction carry out for 16 hours. Then, after stopping the heating and cooling the reaction to room temperature, the polymer [1] was obtained.

0.08 equivalent of JEFFAMINE® D-2000 was added into the aforementioned solution that has been cooled to room temperature to form the crosslinked polymer [2], and the slurry was continuously stirred. The viscosity of the slurry was measure by a rotational viscometer (DV-II+, Brookfield) with the rotating pin at 3 (setting number of S63) and a rotating speed of 100 rpm, and the viscosity of the slurry was raised from 133 cp (centipoise) at the time when JEFFAMINE® D-2000 was added (0 hour) to 854 cp two hours later.

The slurry, after being stirred for 2 hours as mentioned above, was coated on a glass substrate and dried by heating at 170° C., and then a cation-exchange membrane 1 (CEM-1) having a thickness of 80 μm was obtained.

Embodiment 1-G

A glass fiber cloth (47.5 g/m$^2$, 0.045 mm, No. 1080, Glotech Industrial Corp) was used as the substrate, the slurry after being stirred for 2 hours as mentioned in Embodiment 1 was coated on the substrate and dried by heating at 170° C., and then a cation-exchange membrane 1-G (CEM-1-G) was obtained.

Embodiment 2

The slurry including the crosslinked polymer [2] obtained from the polymer [1] was prepared by a process similar to the one described in Embodiment 1, and the difference was that the addition amount of sulfanilic acid sodium salt hydrate was raised to 0.2 equivalent. The viscosity was measured according to the method described in Embodiment 1, and the viscosity of the slurry was raised from 120 cp at the time when JEFFAMINE® D-2000 was added (0 hour) to 531 cp two hours later.

The slurry, after being stirred for 2 hours as mentioned above, was coated on a glass substrate and dried by heating at 170° C., and then a cation-exchange membrane 2 (CEM-2) having a thickness of 130 μm was obtained.

Embodiment 2-G

A glass fiber cloth (47.5 g/m$^2$, 0.045 mm, No. 1080, Glotech Industrial Corp) was used as the substrate, the slurry after being stirred for 2 hours as mentioned in Embodiment 2 was coated on the substrate and dried by heating at 170° C., and then a cation-exchange membrane 2-G (CEM-2-G) was obtained.

Embodiment 3-G

The slurry including the crosslinked polymer [2] obtained from the polymer [1] was prepared by a process similar to the one described in Embodiment 1, and the difference was that the addition amount of sulfanilic acid sodium salt hydrate was raised to 0.24 equivalent. The viscosity was measured according to the method described in Embodiment 1, and the viscosity of the slurry was raised from 149 cp at the time when JEFFAMINE® D-2000 was added (0 hour) to 688 cp two hours later.

A glass fiber cloth (47.5 g/m$^2$, 0.045 mm, No. 1080, Glotech Industrial Corp) was used as the substrate, the slurry after being stirred for 2 hours was coated on the substrate and dried by heating at 170° C., and then a cation-exchange membrane 3-G (CEM-3-G) was obtained.

Embodiment 4-G

The slurry including the crosslinked polymer [2] obtained from the polymer [1] was prepared by a process similar to the one described in Embodiment 1, and the difference was that the addition amount of JEFFAMINE® D-2000 was raised to 0.12 equivalent. The viscosity was measured according to the method described in Embodiment 1, and the viscosity of the slurry was raised from 189 cp at the time when JEFFAMINE® D-2000 was added (0 hour) to 614 cp two hours later.

A glass fiber cloth (47.5 g/m$^2$, 0.045 mm, No. 1080, Glotech Industrial Corp) was used as the substrate, the slurry after being stirred for 2 hours was coated on the substrate and dried by heating at 170° C., and then a cation-exchange membrane 4-G (CEM-4-G) was obtained.

Embodiment 5-G

The slurry including the crosslinked polymer [2] obtained from the polymer [1] was prepared by a process similar to the one described in Embodiment 1, and the difference was that 0.10 equivalent of JEFFAMINE® ED-600 was used as the crosslinking reagent. The viscosity was measured according to the method described in Embodiment 1, and the viscosity of the slurry was raised from 173 cp at the time when JEFFAMINE® D-600 was added (0 hour) to 934 cp two hours later.

A glass fiber cloth (47.5 g/m$^2$, 0.045 mm, No. 1080, Glotech Industrial Corp) was used as the substrate, the slurry after being stirred for 2 hours is coated on the substrate and dried by heating at 170° C., and then a cation-exchange membrane 5-G (CEM-5-G) was obtained.

Embodiment 6-G

The slurry including the crosslinked polymer [2] obtained from the polymer [1] was prepared by a process similar to the one described in Embodiment 1, and the difference was that 0.10 equivalent of JEFFAMINE® T-403 was used as the crosslinking reagent. The viscosity was measured according to the method described in Embodiment 1, and the viscosity of the slurry was raised from 166 cp at the time when JEFFAMINE® T-403 was added (0 hour) to 878 cp two hours later.

A glass fiber cloth (47.5 g/m$^2$, 0.045 mm, No. 1080, Glotech Industrial Corp) was used as the substrate, the slurry after being stirred for 2 hours was coated on the substrate and dried by heating at 170° C., and then a cation-exchange membrane 6-G (CEM-6-G) was obtained.

Embodiment 7-G

The slurry including the crosslinked polymer [2] obtained from the polymer [1] was prepared by a process similar to the one described in Embodiment 1, and the difference was that sulfanilic acid sodium salt hydrate is replaced by 0.16 equivalent of taurine sodium. The viscosity was measured according to the method described in Embodiment 1, and the viscosity of the slurry was raised from 109 cp at the time when JEFFAMINE® T-403 was added (0 hour) to 736 cp two hours later.

A glass fiber cloth (47.5 g/m$^2$, 0.045 mm, No. 1080, Glotech Industrial Corp) was used as the substrate, the slurry after being stirred for 2 hours was coated on the substrate and dried by heating at 170° C., and then a cation-exchange membrane 7-G (CEM-7-G) was obtained.

Embodiment 8-G

The slurry including the crosslinked polymer [2] obtained from the polymer [1] was prepared by a process similar to the one described in Embodiment 1, and the difference is that the addition amount of sulfanilic acid sodium salt hydrate was lowered to 0.12 equivalent, and 0.17 equivalent of JEFFAMINE® D-400 was used as the crosslinking reagent. The viscosity was measured according to the method described in Embodiment 1, and the viscosity of the slurry was raised from 112 cp at the time when JEFFAMINE® D-400 was added (0 hour) to 798 cp two hours later.

A glass fiber cloth (47.5 g/m$^2$, 0.045 mm, No. 1080, Glotech Industrial Corp) was used as the substrate, the slurry after being stirred for 2 hours was coated on the substrate and dried by heating at 170° C., and then a cation-exchange membrane 8-G (CEM-8-G) was obtained.

Embodiment 9-G

The slurry including the crosslinked polymer [2] obtained from the polymer [1] was prepared by a process similar to the one described in Embodiment 1, and the difference was that JEFFAMINE® ED-600 was used as the crosslinking reagent. The viscosity was measured according to the method described in Embodiment 1, and the viscosity of the slurry was raised from 163 cp at the time when JEFFAMINE® ED-600 was added (0 hour) to 1015 cp two hours later.

A glass fiber cloth (47.5 g/m$^2$, 0.045 mm, No. 1080, Glotech Industrial Corp) was used as the substrate, the slurry after being stirred for 2 hours was coated on the substrate and dried by heating at 170° C., and then a cation-exchange membrane 9-G (CEM-9-G) was obtained.

Embodiment 10-G

The slurry including the crosslinked polymer [2] obtained from the polymer [1] was prepared by a process similar to the one described in Embodiment 1, and the difference was that 0.12 equivalents of JEFFAMINE® ED-600 was used as the crosslinking reagent.

A glass fiber cloth (47.5 g/m$^2$, 0.045 mm, No. 1080, Glotech Industrial Corp) was used as the substrate, the slurry after being stirred for 2 hours was coated on the substrate and dried by heating at 170° C., and then a cation-exchange membrane 10-G (CEM-10-G) was obtained.

Embodiment 11-G

The slurry including the crosslinked polymer [2] obtained from the polymer [1] was prepared by a process similar to the one described in Embodiment 1, and the difference was that the addition amount of sulfanilic acid sodium salt hydrate was raised to 0.20 equivalent, and 0.10 equivalents of JEFFAMINE® ED-600 was used as the crosslinking reagent.

A glass fiber cloth (47.5 g/m$^2$, 0.045 mm, No. 1080, Glotech Industrial Corp) was used as the substrate, the slurry after being stirred for 2 hours was coated on the substrate and dried by heating at 170° C., and then a cation-exchange membrane 11-G (CEM-11-G) was obtained.

Embodiment 12-G

The slurry including the crosslinked polymer [2] obtained from the polymer [1] was prepared by a process similar to the one described in Embodiment 1, and the difference was that JEFFAMINE® T-403 was used as the crosslinking reagent.

A glass fiber cloth (47.5 g/m$^2$, 0.045 mm, No. 1080, Glotech Industrial Corp) was used as the substrate, the slurry after being stirred for 2 hours was coated on the substrate and dried by heating at 170° C., and then a cation-exchange membrane 12-G (CEM-12-G) was obtained.

Embodiment 13-G

The slurry including the crosslinked polymer [2] obtained from the polymer [1] was prepared by a process similar to the one described in Embodiment 1, and the difference was that JEFFAMINE® D-400 was used as the crosslinking reagent.

A glass fiber cloth (47.5 g/m$^2$, 0.045 mm, No. 1080, Glotech Industrial Corp) was used as the substrate, the slurry after being stirred for 2 hours was coated on the substrate and dried by heating at 170° C., and then a cation-exchange membrane 13-G (CEM-13-G) was obtained.

Embodiment 14-G

The slurry including the crosslinked polymer [2] obtained from the polymer [1] was prepared by a process similar to the one described in Embodiment 1, and the difference was that 0.12 equivalent of JEFFAMINE® D-400 was used as the crosslinking reagent.

A glass fiber cloth (47.5 g/m$^2$, 0.045 mm, No. 1080, Glotech Industrial Corp) was used as the substrate, the slurry after being stirred for 2 hours was coated on the substrate and dried by heating at 170° C., and then a cation-exchange membrane 14-G (CEM-14-G) was obtained.

Embodiment 15-G

The slurry including the crosslinked polymer [2] obtained from the polymer [1] was prepared by a process similar to the one described in Embodiment 1, and the difference was that the addition amount of sulfanilic acid sodium salt hydrate was raised to 0.20 equivalent, and 0.12 equivalents of JEFFAMINE® D-400 was used as the crosslinking reagent.

A glass fiber cloth (47.5 g/m$^2$, 0.045 mm, No. 1080, Glotech Industrial Corp) was used as the substrate, the slurry after being stirred for 2 hours was coated on the substrate and dried by heating at 170° C., and then a cation-exchange membrane 15-G (CEM-15-G) was obtained.

Comparative Embodiment 1

The slurry was prepared by a process similar to that described in Embodiment 1, and the difference was that after the slurry including the polymer [1] was cooled to room temperature, the slurry, without any crosslinking reagent added, was directly coated on a glass substrate and dried by heating at 170° C., and then a cation-exchange membrane C1 (CEM-C1) was obtained. However, the cation-exchange membrane C1 was too fragile to form a membrane, and even a membrane was partially formed, the partially-formed membrane was very fragile and cracks easily, thus it was unable to perform subsequent measurements.

Comparative Embodiment 1-G

A glass fiber cloth (47.5 g/m$^2$, 0.045 mm, No. 1080, Glotech Industrial Corp) was used as the substrate, the slurry of Comparative embodiment 1 was coated on the substrate and dried by heating at 170° C., and then a cation-exchange membrane C1-G (CEM-C-G) was obtained. However, the cation-exchange membrane partially dissolves in water, so that it was unable to perform subsequent measurements as well.

Comparative Embodiment 2-G

The slurry was prepared by a process similar to that described in Embodiment 1, and the difference was that no grafting reagent was added into the sulfanilic acid sodium salt hydrate. A glass fiber cloth (47.5 g/m$^2$, 0.045 mm, No. 1080, Glotech Industrial Corp) was used as the substrate, the slurry was coated on the substrate and dried by heating at 170° C., and then a cation-exchange membrane C2-G (CEM-C2-G) was obtained.

The conditions, viscosities, film forming abilities, and evaluations of water solubility of the above embodiments and comparative embodiments were listed in table 1.

[Evaluation of Film-Forming Ability]

The membranes or structure-enhanced membranes obtained from the above embodiments were visually characterized based on the following criteria:

O: forming uniform and flexible membrane A: forming uniform but fragile membrane that cannot be folded in halves or breaks after folding X: partial peelings or cracking occurred in one or more locations

[Evaluation of water solubility]

The membranes or structure-enhanced membranes obtained from the above embodiments were placed in water and visually characterized based on the following criteria:

O: at least partially peeled or dissolved

X: forming intact membrane without peelings and dissolving

TABLE 1

|  | Grafting reagent (equivalent) | Crosslinking reagent (equivalent) | Crosslinking reagent | Original viscosity (cp) | Viscosity after reaction (cp) | Film-forming ability | Water solubility |
|---|---|---|---|---|---|---|---|
| CEM-1 | 0.16 | 0.08 | D-2000 | 133 | 854 | O | X |
| CEM-1-G | 0.16 | 0.08 | D-2000 | 133 | 854 | O | X |
| CEM-2 | 0.20 | 0.08 | D-2000 | 120 | 531 | O | X |
| CEM-2-G | 0.20 | 0.08 | D-2000 | 120 | 531 | O | X |
| CEM-3-G | 0.24 | 0.08 | D-2000 | 149 | 688 | Δ | X |
| CEM-4-G | 0.16 | 0.12 | D-2000 | 189 | 614 | O | X |
| CEM-5-G | 0.16 | 0.10 | ED-600 | 173 | 934 | O | X |
| CEM-6-G | 0.16 | 0.10 | T-403 | 166 | 878 | O | X |
| CEM-7-G | T-0.16* | 0.08 | D-2000 | 109 | 736 | O | X |
| CEM-8-G | 0.12 | 0.17 | D-400 | 112 | 798 | O | X |
| CEM-9-G | 0.16 | 0.08 | ED-600 | — | — | Δ | X |
| CEM-10-G | 0.16 | 0.12 | ED-600 | 163 | 1015 | O | X |
| CEM-11-G | 0.20 | 0.10 | ED-600 | — | — | O | X |
| CEM-12-G | 0.16 | 0.08 | T-403 | — | — | Δ | X |
| CEM-13-G | 0.16 | 0.08 | D-400 | — | — | Δ | X |
| CEM-14-G | 0.16 | 0.12 | D-400 | 157 | 917 | O | X |
| CEM-15-G | 0.20 | 0.12 | D-400 | — | — | O | X |
| CEM-C1 | 0.16 | — | — | 162 | 173 | X | O |
| CEM-C1-G | 0.16 | — | — | 162 | 173 | O | O |
| CEM-C2-G | — | 0.08 | D-2000 | 153 | 2092 | O | X |

* "T" indicates that taurine sodium was used, when other embodiments and comparative embodiments adopt sulfanilic acid sodium salt hydrate.

Embodiment 1 was taken as an example. The staring polymer [A] was a styrene-maleic anhydride polymer, the molar ratio of the styrene unit to the maleic anhydride unit was 6:4. 0.1 equivalent of the styrene-maleic anhydride polymer (that was, there was 0.6 equivalent of styrene units and 0.4 equivalent of maleic anhydride units) and the grafting reagent were reacted with 0.16 equivalent of sulfanilic acid sodium salt hydrate to form the polymer [1]. 0.4 equivalent of the maleic anhydride units in the starting polymer [A] (styrene-maleic anhydride polymer) was reacted with 0.16 equivalent of sulfanilic acid sodium salt hydrate to obtain 0.16 equivalent of maleic anhydride units grafted with anions, and 0.24 equivalent of the maleic anhydride units remain ungrafted. One diamine crosslinking reagent can react with two ungrafted maleic anhydride units, thus the 0.24 equivalent of the ungrafted maleic anhydride units can react with at most 0.24/2 equivalent of the diamine crosslinking reagent; therefore, after 0.08 equivalent of the crosslinking reagent [C] was added, there were still ungrafted maleic anhydride units in the as-formed crosslinked polymer [2].

Embodiment 1 was taken as an example again. As described above, 0.4 equivalent of the maleic anhydride units in the starting polymer [A] (styrene-maleic anhydride polymer) was reacted with 0.16 equivalent of sulfanilic acid sodium salt hydrate to obtain 0.16 equivalent of maleic anhydride units grafted with anions, and 0.24 equivalent of the maleic anhydride units remain ungrafted. After 0.08 equivalent of the crosslinking reagent [C] was added, the crosslinked polymer (formula (VI)) was formed, and since every one unit of the crosslinking reagents [C] can react with two ungrafted maleic anhydride units, the molar ratio of n:o' was 0.16:0.08*2, that was, 1:1.

Since the polymer [1] has ungrafted maleic anhydride units that can further react with the crosslinking reagent, as shown in table 1, the polymer [1] together with the crosslinking reagent [C] can form the crosslinked polymer [2] after the crosslinking reagent was added, and thus the overall viscosity of the slurry can be effectively increased to a suitable operating region (generally speaking, the viscosity needs to be from 500 cp to 5000 cp in order to provide a better film-forming ability).

As a comparison, as shown in table 1, the sample of Comparative embodiment 1 (CEM-C1), without the addition of the crosslinking reagent, even cannot have enough flexibility to form a membrane. Even the slurry without the crosslinking reagent of Comparative embodiment 1 was placed on the substrate and a membrane was formed (Comparative embodiment 1-G, CEM-C1-G), after the membrane was placed in water or an aqueous solution, it partially dissolves, thus it cannot be used as an ion-exchange membrane that requires to be operated in an aqueous solution environment. In contrast, the polymer membranes formed from the crosslinking reagent can be present in water stably.

According to the cation-exchange membrane CEM-3-G formed of the sample of Embodiment 3-G, when the amount of the grafting reagent was increased resulting in the reduction of crosslinkable maleic anhydride units, the film-forming ability of the crosslinked polymer may be affected.

According to Embodiments 1-G, 9-G and 13-G, when a crosslinking reagent having a relatively low molecular weight, the cation-exchange membranes formed of the samples of Embodiments 9-G and 13-G were relatively fragile, and the film forming abilities were slightly worse than that of Embodiment CEM-1-G. Therefore, by adding a relatively large amount (e.g., Embodiments 10-G and 14-G) or an excess amount (e.g., Embodiments 11-G and 15-G) in the slurry, the overall flexibility and film-forming ability of the ion membrane can be increased under some circumstances.

In addition, according to table 1, when the ratio of the grafting reagent to the maleic anhydride units in the compound having a styrene-maleic anhydride structure was too high (e.g., Embodiment CEM-3-G), since the amount of the remaining ungrafted maleic anhydride units that can react with the crosslinking reagent was relatively low, the film-forming ability may be affected even a crosslinking reagent having a relatively large molecular weight was used subsequently.

Measurements were performed on some of the ion membranes in the above embodiments. The measured results of expansion rate, mechanical strength, and sheet resistance were listed in table 2.

TABLE 2

| | CEM-1 | CEM-1-G | CEM-2-G | CEM-3-G | CEM-5-G | CEM-6-G | CEM-7-G | CEM-C2-G |
|---|---|---|---|---|---|---|---|---|
| Grafting reagent (equivalent) | 0.16 | 0.16 | 0.20 | 0.24 | 0.16 | 0.16 | T-0.16* | X |
| Crosslinking reagent (equivalent) | D-2000 (0.08) | D-2000 (0.08) | D-2000 (0.08) | D-2000 (0.08) | ED-600 (0.10) | T-403 (0.10) | D-2000 (0.08) | D-2000 (0.08) |
| Expansion rate (%) | 25.8 | 0.3 | 0.2 | 0.5 | 0.2 | 0.1 | 1.1 | 0.1 |
| Mechanical strength (MPa/cm$^2$) | 14.52 | 40.46 | 38.93 | 36.10 | 34.13 | 38.21 | 33.87 | 45.62 |
| Sheet resistance ($\Omega$*cm$^2$) | 5.4 | 6.7 | 4.6 | 3.5 | 3.1 | 8.8 | 1.8 | 3040 |

* "T" indicates that taurine sodium was used, when other embodiments and comparative embodiments adopt sulfanilic acid sodium salt hydrate.

[Expansion rate]

In table 2, the expansion rate was represented by the elongation rate, that was, the ratio of the increased length to the original length of a dry membrane (((the length of the membrane after water absorption and equilibrium was reached–the length of the membrane before water absorption)/the length of the membrane before water absorption) *100%). Since a dry ion membrane absorbs water and expands after it was placed in water or a solution, and a membrane expands or shrinks when it was moved from one solution to another solution, which was called the expansion of membrane. Practically, the expansion of an ion-exchange membrane in a solution was preferably the smaller and more uniform the better. In addition, particularly, the expansion along planar directions should be as small as possible, so that water leakage and electric leakage due to water pressure increasing can be prevented, and deformation during use possibly resulted from changes of solution concentrations, temperatures, and humidity does not occur.

[Mechanical Strength]

The measurement was performed with a dynamic mechanical analyzer (TA-DMA-Q800 instrument), the sample size was 5 mm long and 10 mm wide, and the thickness was input according to the current measurement result. The sample was stretched at 3 N/min until the sample breaks or reaches the limit of the machine, i.e., 18N, and the stress value (MPa/cm$^2$) was recorded.

[Sheet Resistance]

After a sample was immersed in 0.5M NaCl solution for 24 hours, the sample was taken out and analyzed by EIS (electrochemical impedance spectroscopy, EIS), which was an electrochemical analysis method, at 3M Hz to 0.1 Hz.

According to table 2, compared to the ion-exchange membrane having no substrate CEM-1, the mechanical strength of the ion-exchange membrane having a substrate CEM-1-G was greatly increased, and the expansion was reduced significantly. Therefore, the following experiments were performed on ion-exchange membranes having substrates. According to table 2, the structure-enhanced membranes having substrates all have relatively low expansion and relatively high mechanical strength.

Due to the introduction of anionic groups into the crosslinked polymer, as shown in table 2, most of the ion membranes have relatively low sheet resistance, and the membrane of Comparative embodiment 2-G (CEM-C2-G) without introducing anionic groups has very high sheet resistance. As shown in the results of Embodiments CEM-1-G, CEM-2-G, and CEM-3-G, when the grafted anionic groups were increased, the sheet resistance was further reduced. Besides, the ion membrane CEM-7-G formed of the crosslinked polymer made by using taurine sodium as the grafting reagent has a sheet resistance of only 1.8 Ω*cm².

[Desalination Test]

In order to simulate the condition where ion membranes were used for electrodialysis (ED), desalination tests were performed on some of the above-mentioned ion-exchange membranes. Two titanium metal plates were placed in a tank as positive and negative electrodes, and a corresponding ion-exchange membrane was placed between these two titanium metal plates. A 1000 ppm NaCl aqueous solution was placed in the tank, the two titanium metal plates were respectively connected to a positive electrode and a negative electrode, and a constant current of 0.1 A was applied for one hour. When the power was on, the Na⁺ ions in the solution were repelled by the positive electrode and attracted by the anionic groups in the cation-exchange membrane to enter the cation-exchange membrane, and then leave the cation-exchange membrane and arrive at the other side of the membrane due to the attraction of the negative electrode. As the concentration of the Na⁺ ions was increased, the Na⁺ ions and water form hydrated ions, resulting in the increase of pH value on that side. The concentration of the Na⁺ ions on that side can be derived by a titration method (for example, using a silver nitrate aqueous solution). As such, it was determined that the desalination rate (%)=((Na⁺ ion concentration on negative electrode side after electrodialysis−original Na⁺ ion concentration)/original Na⁺ ion concentration)*100%. The results of the operating voltages and desalination rates of the tests were listed in table 3.

TABLE 3

| | Grafting reagent | Crosslinking reagent (equivalent) | Crosslinking reagent | Operating voltage (V) | Desalination rate (%) |
|---|---|---|---|---|---|
| CEM-1-G | 0.16 | 0.08 | D-2000 | 4.1 | 73.21 |
| CEM-2-G | 0.20 | 0.08 | D-2000 | 4.2 | 74.46 |
| CEM-5-G | 0.16 | 0.10 | ED-600 | 4.4 | 74.23 |
| CEM-7-G | T-0.16 | 0.08 | D-2000 | 4.3 | 78.66 |
| CEM-11-G | 0.20 | 0.10 | ED-600 | 4.4 | 75.52 |
| CEM-14-G | 0.16 | 0.12 | D-400 | 4.5 | 73.33 |

As shown in table 3, the cation-exchange membranes of the present disclosure all have desalination rates of 70% or higher. The ion membrane CEM-&-G formed of the crosslinked polymer obtained by using taurine sodium as the grafting reagent has a desalination rate of almost 80%. Compared to Embodiments CEM-1-G and CEM-5-G, Embodiments CEM-2-G and CEM-11-G have increased amount of anionic groups, and thus the desalination rates were further increased.

While the disclosure has been described by way of example and in terms of the exemplary embodiments, it should be understood that the disclosure was not limited thereto. On the contrary, it will be apparent to those skilled in the art that various modifications and variations can be made to the disclosed embodiments. It was intended that the specification and examples be considered as exemplary only, with a true scope of the disclosure being indicated by the following claims and their equivalents.

What is claimed is:

1. A crosslinked polymer having a structure represented by

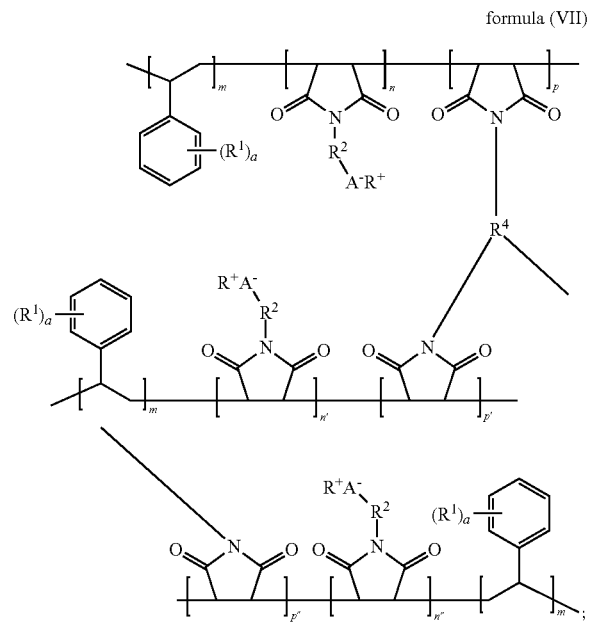

formula (VII)

. . . formula (VTI);

wherein units in formula (VII) are arranged in an alternating fashion, in a random fashion, or in discrete blocks;

a is an integer from 0 to 5;

$R^1$ is a $C_1$-$C_8$ alkyl group, a $C_3$-$C_8$ cycloalkyl group, a $C_1$-$C_8$ alkoxyl group, or a $C_1$-$C_8$ alkoxyalkyl group;

$R^2$ is a $C_6$-$C_{16}$ arylene group, a $C_1$-$C_8$ alkylene group, a $C_3$-$C_8$ cycloalkylene group, or a $C_1$-$C_8$ alkoxyalkylene group;

$A^-$ is —$SO_3^-$, —$NO_3^-$, or —$COO^-$;

$R^+$ is $H^+$, $Li^+$, $Na^+$, $K^+$, or $NH_4^+$;

m:n is from 99:1 to 70:30;

n:o' is from 2:1 to 3:7;

n:p is from 6:4 to 4:6;

m:n' is from 99:1 to 70:30;

n':o" is from 2:1 to 3:7;

n':p' is from 6:4 to 4:6;

m:n" is from 99:1 to 70:30;

n":p" is from 6:4 to 4:6;

$R^4$ is

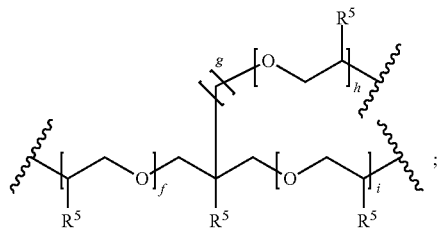

wherein f+h+i is 5 to 10 and g is 0 or 1; and $R^5$ is independently H or a $C_1$-$C_4$ alkyl group.

2. A crosslinked polymer formed from a compound having a styrene-maleic anhydride structure, a compound having a

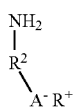

structure, and a compound having multiple amino terminal groups which is $R^4(NH_2)_3$,
wherein $R^2$ is a $C_6$-$C_{16}$ arylene group, a $C_1$-$C_8$ alkylene group, a $C_3$-$C_8$ cycloalkylene group, or a $C_1$-$C_8$ alkoxyalkylene group;
$A^-$ is $-SO_3^-$, $-NO_3^-$, or $-COO^-$; and
$R^+$ is $H^+$, $Li^+$, $Na^+$, $K^+$, or $NH_4^+$;
$R^4$ is

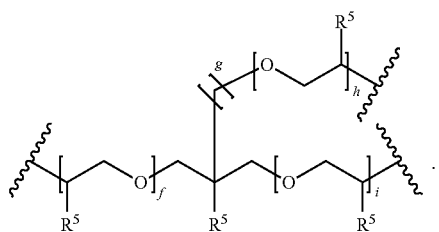

wherein $f+h+i$ is 5 to 10 and g is 0 or 1;
$R^5$ is independently H or a $C_1$-$C_4$ alkyl group;
a molar equivalent quantity ($N_1$) of the compound having a

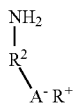

structure is less than a molar equivalent quantity ($N_2$) of the maleic anhydride of the compound having a styrene-maleic anhydride structure; and
a molar equivalent quantity ($N_3$) of the compound having multiple amino terminal groups is greater than or equal to ($N_2$−$N_1$)/number of amino groups in the compound having multiple amino terminal groups.

3. The crosslinked polymer as claimed in claim 2, wherein the compound having a styrene-maleic anhydride structure has a structure:

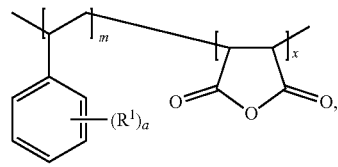

wherein m:x is from 60:40 to 85:15;
a is an integer from 0 to 5;
$R^1$ is a $C_1$-$C_8$ alkyl group, a $C_3$-$C_8$ cycloalkyl group, a $C_1$-$C_8$ alkoxyl group, or a $C_1$-$C_8$ alkoxyalkyl group.

4. The crosslinked polymer as claimed in claim 2, wherein a molar equivalent ratio of the compound having a

structure to the compound having multiple amino terminal groups is from 3:7 to 2:1.

* * * * *